US007734758B1

(12) United States Patent
Lo Bue et al.

(10) Patent No.: US 7,734,758 B1
(45) Date of Patent: Jun. 8, 2010

(54) USB ENCAPSULATION FOR NETWORK TRANSMISSION

(75) Inventors: Brian Lo Bue, Irvine, CA (US); Darrell Shively, El Toro, CA (US); Larry Nadeau, Irvine, CA (US); Thomas A. Roden, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 1539 days.

(21) Appl. No.: 09/618,950

(22) Filed: Jul. 19, 2000

(51) Int. Cl.
*G06F 15/173* (2006.01)
(52) U.S. Cl. .................................................. 709/224
(58) Field of Classification Search ................. 710/313, 710/8–19; 709/249, 219, 217, 227, 223–224, 709/250
See application file for complete search history.

(56) References Cited

U.S. PATENT DOCUMENTS

| | | | | |
|---|---|---|---|---|
| 4,933,937 A | 6/1990 | Konishi | ................... | 370/85.13 |
| 5,319,644 A | 6/1994 | Liang | ........................ | 370/85.5 |
| 5,371,852 A | 12/1994 | Attanasio et al. | ............ | 395/200 |
| 5,394,402 A | 2/1995 | Ross | ........................ | 370/94.1 |
| 5,710,885 A * | 1/1998 | Bondi | ........................ | 709/224 |
| 5,715,394 A | 2/1998 | Jabs | ....................... | 395/200.11 |
| 5,787,255 A | 7/1998 | Parlan et al. | ........... | 395/200.63 |
| 5,802,042 A | 9/1998 | Natarajan et al. | ........... | 370/255 |
| 5,854,901 A | 12/1998 | Cole et al. | ............. | 395/200.75 |
| 5,918,016 A | 6/1999 | Brewer et al. | ............. | 395/200.5 |
| 5,968,116 A | 10/1999 | Day, II et al. | ................ | 709/202 |
| 6,009,480 A * | 12/1999 | Pleso | ........................... | 710/8 |
| 6,021,415 A | 2/2000 | Cannon et al. | ............. | 707/206 |
| 6,157,950 A * | 12/2000 | Krishnan | .................... | 709/223 |
| 6,256,670 B1 * | 7/2001 | Davies | ...................... | 709/224 |
| 6,369,909 B1 * | 4/2002 | Shima | ....................... | 358/1.15 |
| 6,404,739 B1 * | 6/2002 | Gonno | ....................... | 370/236 |
| 6,473,854 B1 * | 10/2002 | Fleming, III | .................. | 713/1 |
| 6,611,881 B1 * | 8/2003 | Gottfurcht et al. | ............ | 710/18 |
| 6,671,765 B1 * | 12/2003 | Karlsson et al. | ............. | 710/310 |
| 6,697,372 B1 * | 2/2004 | McAlear | ..................... | 370/402 |
| 6,728,787 B1 * | 4/2004 | Leigh | ......................... | 719/327 |
| 6,732,067 B1 * | 5/2004 | Powderly | .................... | 715/740 |
| 2002/0095501 A1* | 7/2002 | Chiloyan et al. | ............ | 709/227 |
| 2002/0141418 A1* | 10/2002 | Ben-Dor et al. | ............. | 370/398 |

FOREIGN PATENT DOCUMENTS

WO 98/11704 3/1998

\* cited by examiner

*Primary Examiner*—Aaron Strange
(74) *Attorney, Agent, or Firm*—Patent Capital Group

(57) ABSTRACT

A universal serial bus (USB) remote host control driver includes a connection to a local network, a network protocol stack and a memory for storing network addresses of USB device adapters and USB devices on the network. A USB device adapter has one or more USB ports, a network connection, a network address, and a network protocol stack. Together, the USB remote host control driver and the USB device adapter enable interaction between a network computer and peripheral USB devices on the network.

64 Claims, 12 Drawing Sheets

USB ENCAPSULATION FOR NETWORK TRANSMISSION

BACKGROUND OF THE INVENTION

1. Field of the Invention

The present invention relates to computer networking. More particularly, the invention relates to networking peripheral universal serial bus (USB) devices.

2. Background Art

A personal computer or workstation tends to have a standard set of input devices to allow it to be controlled. These devices include: keyboard, mouse, joystick, game pad and steering wheel. The Universal Serial bus (USB) is available as a single bus that can accommodate these devices.

Computers implement USB as a host. The host is the one master on an instance of USB. All USB devices are slaves. The only device that has any mastering capabilities is a USB hub. USB hubs are allowed to assert master signaling on their downstream ports only in immediate and direct response to signaling on their upstream port.

A computer accesses a USB device via a Host Controller Driver (HCD). The HCD allows the computer to determine what USB devices are attached, characterize them, enable them and use them. For example, a keyboard may be discovered and configured as a system input device.

Network devices are typically not equipped to be USB hosts. Even if they were, cabling requirements and distance limitations would restrict the usefulness of USB as a network peripheral bus. Network devices are typically controlled either by a local serial port running a simple terminal protocol, or a network protocol (e.g. telnet, SNMP) running over an IP network. The network protocols used to interact with a network device are typically device independent and are used for special purpose status and control functions or network services.

In some cases, it is desirable that USB peripheral devices be able to interact with network devices. For example, such functionality would allow a USB device to interface with network devices over a network without the need for a standard terminal or computer. Also, this would allow applications such as remote gaming to be enhanced because raw device input data could be routed to a remote server where the game was running. This would allow users without computers (other than a gateway) to run arbitrarily complex games and applications.

SUMMARY OF THE INVENTION

A universal serial bus (USB) remote host control driver includes a connection to a local network, a network protocol stack and a memory for storing network addresses of USB device adapters and USB devices on the network. A USB device adapter has one or more USB ports, a network connection, a network address, and a network protocol stack. Together, the USB remote host control driver and the USB device adapter enable interaction between a network computer and peripheral USB devices on the network.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons having the benefit of this disclosure.

Figure 1:
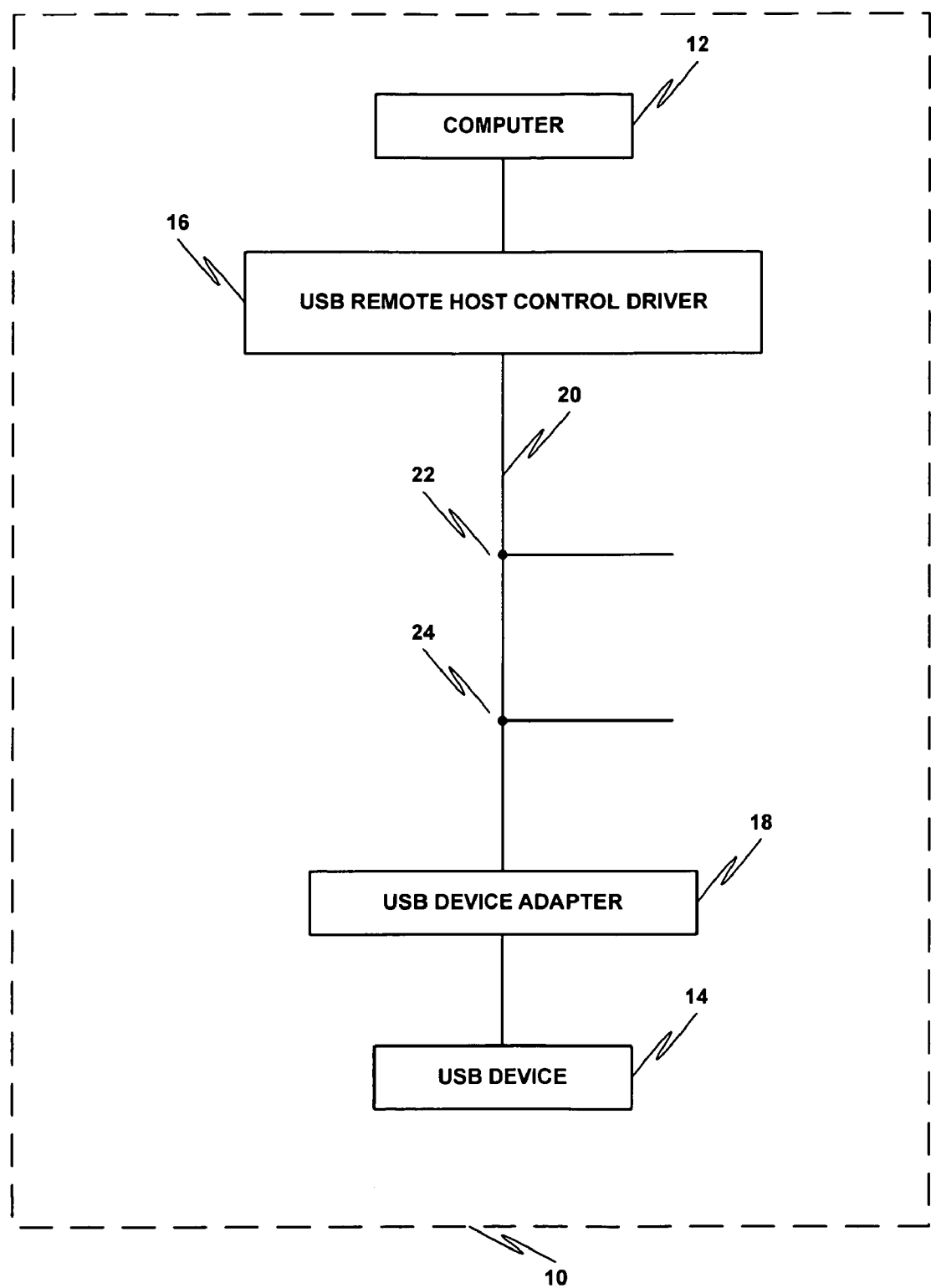
FIG. 1 is a block diagram showing a USB remote host control driver connected over a local network to a USB device via a USB device adapter in accordance with a specific embodiment of the present invention.

FIG. 1 is a block diagram showing a USB remote host control driver connected over a network to a USB device via a USB device adapter in accordance with a specific embodiment of the present invention. Network 10 includes a computer 12 and a USB device 14. The network 10 may be located in a residence, for example. Instead of connecting the USB device 14 directly to the computer 12, as in the prior art, the USB device 14 is connected to a USB device adapter 18. The computer is connected to, or includes internally, a USB remote host control driver 16. The USB device adapter 18 communicates with the USB remote host control driver 16 via the network. For example, the network may be a local network such as an Ethernet 20 having connections 22, 24 for other computers and/or devices. The invention is also suitable for IP networks such as a WAN or the Internet.

Figure 2:
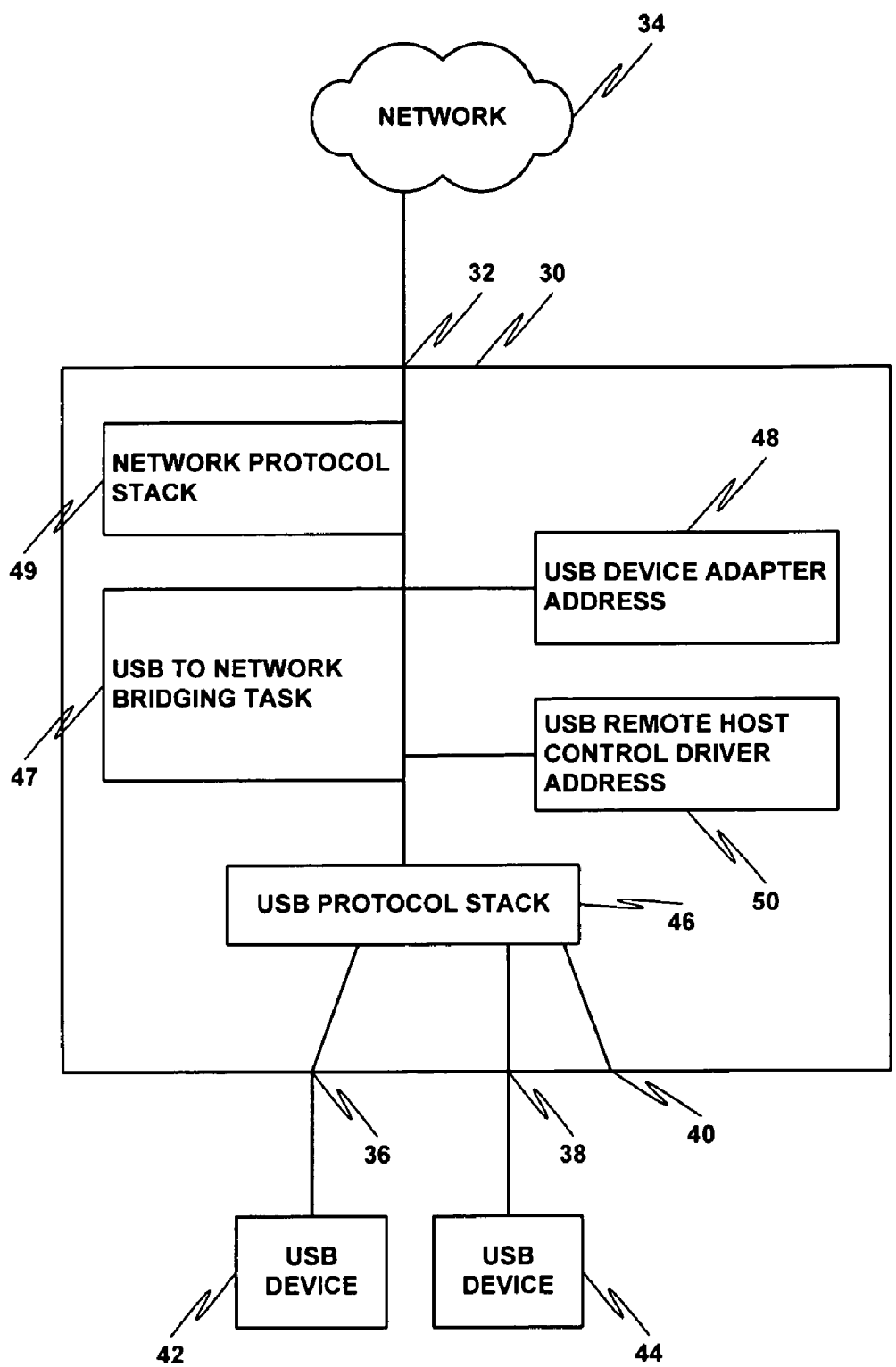
FIG. 2 is a block diagram of a USB device adapter in accordance with a specific embodiment of the present invention.

FIG. 2 is a block diagram of a USB device adapter in accordance with a specific embodiment of the present invention. USB device adapter 30 has a connection 32 to a network 34. USB device adapter 30 also has ports 36, 38, 40 for USB devices. For example, USB device 42 is connected to port 36 and USB device 44 is connected to port 38. USB device adapter 30 includes a USB protocol stack 46. The USB protocol stack 46 receives USB packets from, and transmits USB packets to, USB devices 42, 44. USB packets received from the devices are passed to a USB to network bridging task 47. Bridging task 47 garners addressing information and passes the USB packets and the addressing information to a Network Protocol Stack 49. Network Protocol Stack 49 encapsulates USB packets produced by the USB devices into network packets and transmits the network packets onto the network 34. The USB device adapter 30 also receives network packets from the network 34 and decapsulates USB packets from network packets before providing them to the USB devices. The USB device adapter also includes its own address 48 as well as the address 50 of its master USB remote host control driver, allowing identification on the network.

Figure 3:
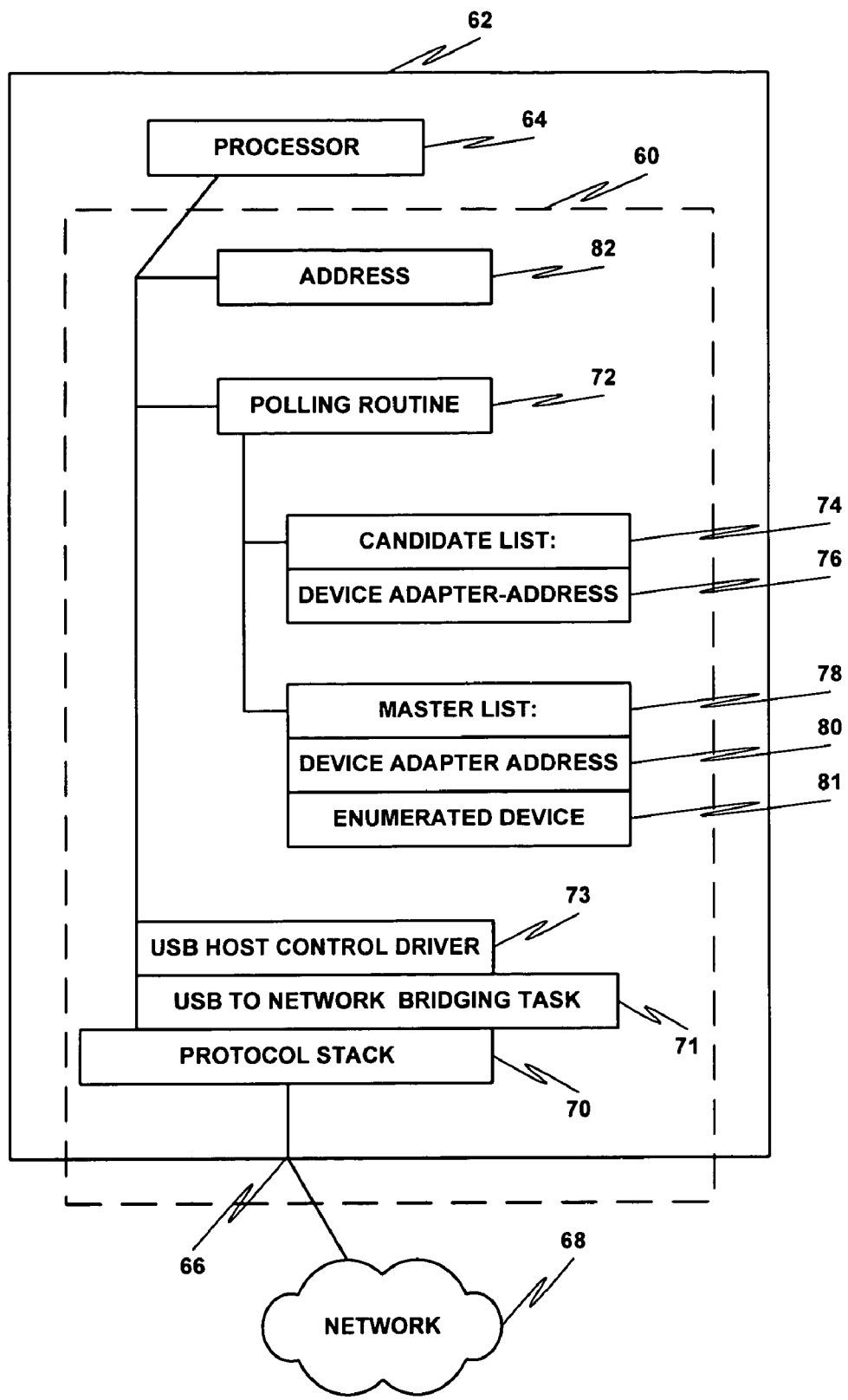
FIG. 3 is a block diagram of a USB remote host control driver in accordance with a specific embodiment of the present invention.

FIG. 3 is a block diagram of a USB remote host control driver in accordance with a specific embodiment of the present invention. In the example shown, the USB remote host control driver 60 is implemented as a component of a computer 62. Though not shown, it is also possible to implement the USB remote host control driver separate but connected to a computer.

The USB remote host control driver 60 communicates with a local network 68 via a connection 66. The USB remote host control driver 60 includes a protocol stack 70. The protocol stack 70 receives network packets from, and transmits network packets to, the network 68. USB packets decapsulated from network packets are passed to and from a USB and Network bridging task 71, which garners addressing information from the protocol stack 70 and memory, and which, in turn, passes the USB packets to and from a USB host control driver 73. The protocol stack 70 also encapsulates USB packets into network packets and transmits the network packets on the network 68. The USB remote host control driver 60 includes a polling routine 72 for identifying and enabling USB devices onto the network 68. The polling routine 72 uses a candidate list 74 containing possible addresses of USB device adapters 76 to search the network for USB device adapters and USB devices. Once the devices are found, the addresses of networked USB device adapters 80 and USB devices 81 are incorporated into a master list 78. The USB remote host control driver 60 also includes its own network address 82 allowing its identification on the network 68.

Figure 4:
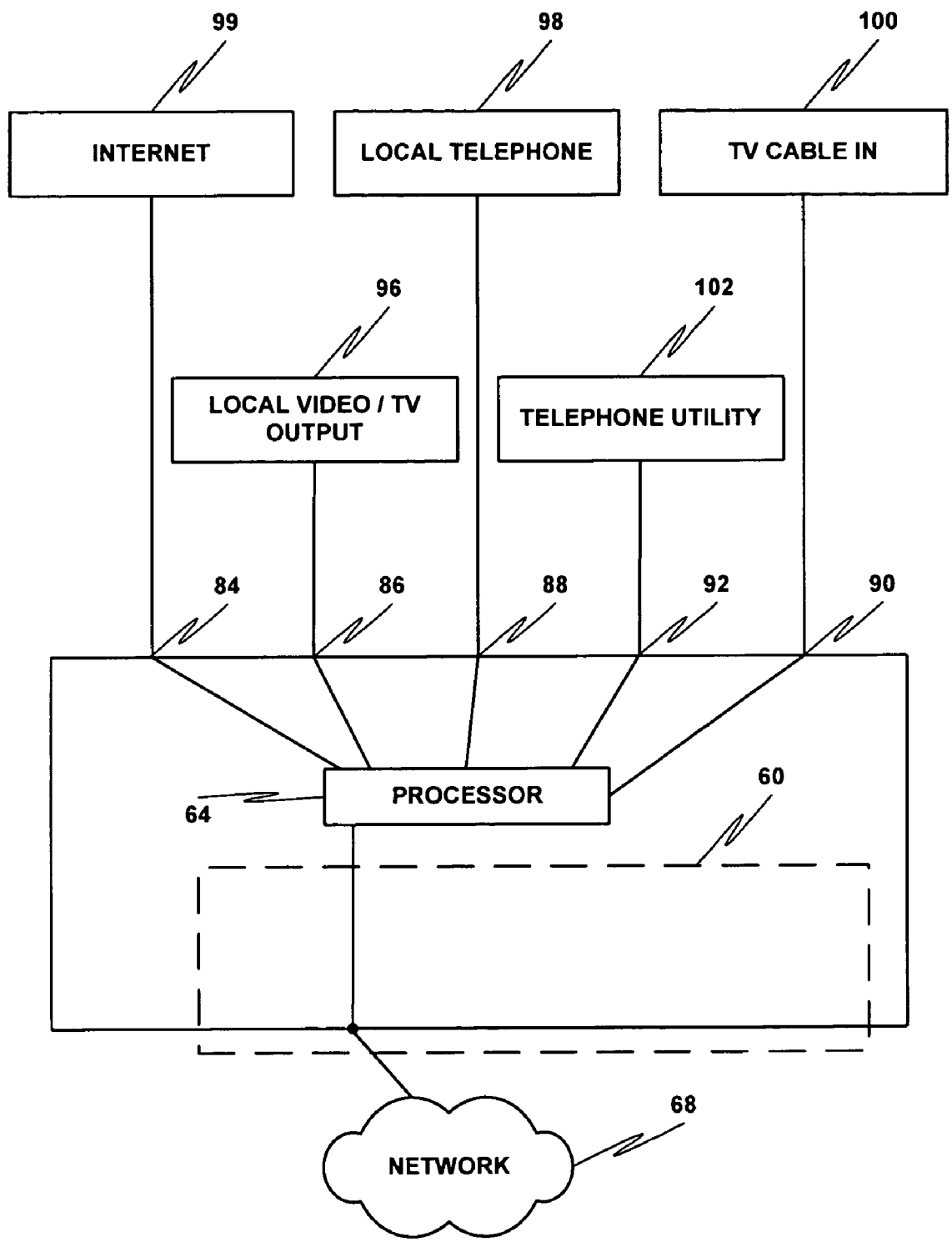
FIG. 4 is a block diagram of a USB remote host control driver in accordance with a specific embodiment of the present invention.

FIG. 4 is a block diagram of a USB remote host control driver in accordance with a specific embodiment of the present invention. In this figure, the same USB remote host control driver 60 is shown as in FIG. 3, except that the computer 62 is implemented as a gateway and communications controller. This implementation demonstrates several advantages of the invention. The computer 62 has ports 84, 86, 88, 90, 92 for many utilities and devices including Internet 94, local output to video/TV 96, local (on location) telephone 98, TV cable input 100 and telephone utility 102. It will be appreciated that many other utilities and devices may be connected to the computer 62.

One application of the invention utilizes the Internet 94 and the local TV/video output 96. In this application, a user may interact with an Internet server by a USB device on the local network without the need for any local computer other than the gateway. USB control signals, from a keyboard or joystick for example, are sent over the local network to the computer 62 and routed to the Internet server. Signals from the Internet server may be returned to the user via the to local video/TV output. Such an implementation allows users without computers (other than a gateway) to run arbitrarily complex games and applications.

In general, the invention allows USB devices to interface with network devices without the need for a standard terminal or computer. In an example using only the local network, a USB cameras and video outputs could be used to provide two-way communication on a network using only a central computer 62.

Figure 5:
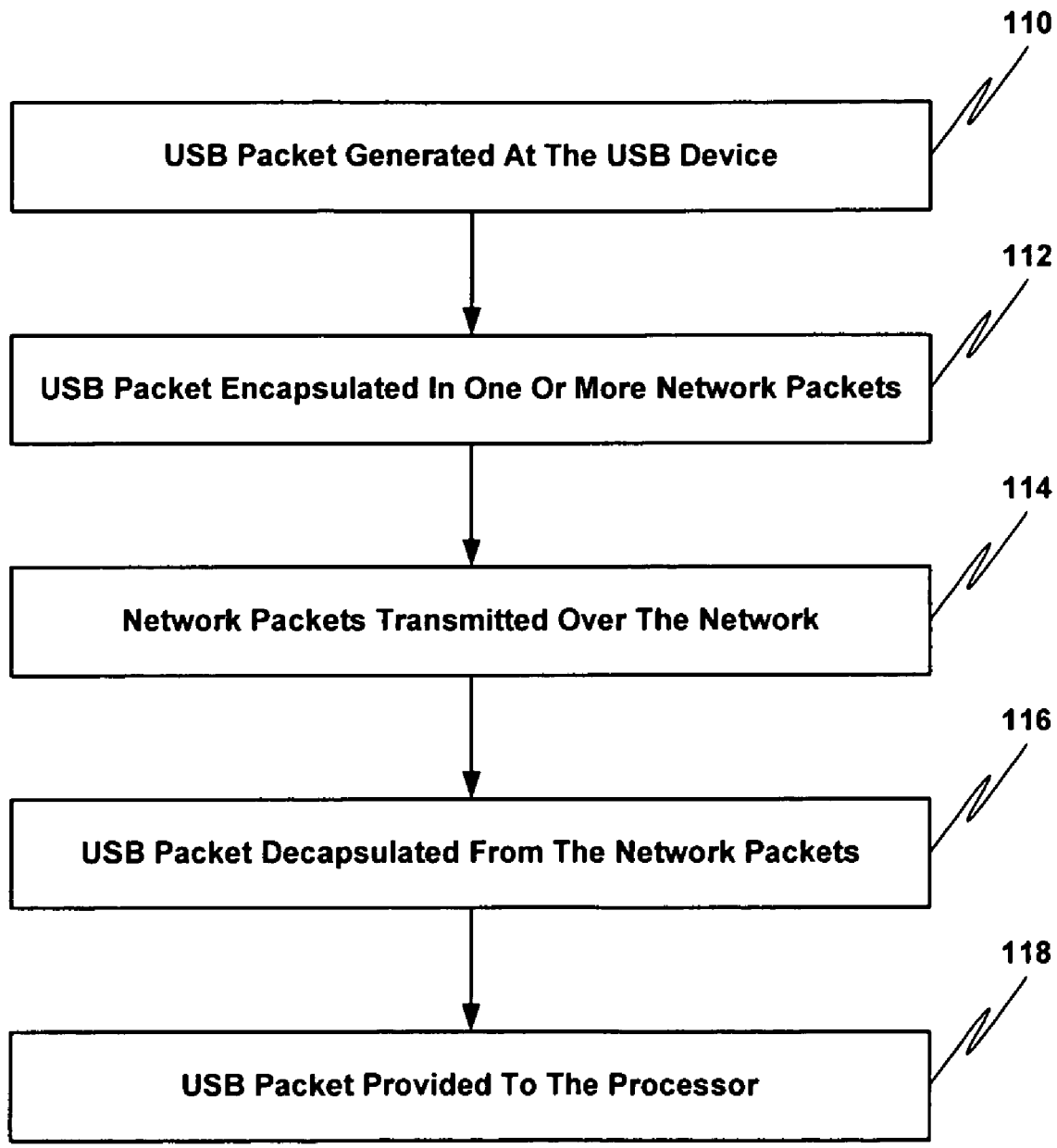
FIG. 5 is a process flow diagram showing a method of providing a signal from a USB device over a local network to a local processor in accordance with a specific embodiment of the present invention.

FIG. 5 is a process flow diagram showing a method of providing a signal from a USB device over a local network to a local processor in accordance with a specific embodiment of the present invention. In the method, a USB packet is generated at the USB device 110. Then, the USB packet is encapsulated in one or more network packets 112 by the USB device adapter. The network packets are transmitted over the network 114. In the protocol stack of the USB remote host control driver, the USB packet is decapsulated from the network packets 116. Then, the USB packet is provided to the processor 118 for further processing. It will be appreciated that this method is completely reversible. When transmitting control signals or data (e.g., output to USB speakers), the processor-generated USB signals are encapsulated, transmitted over the network, and decapsulated at the destination USB device.

Figure 6:
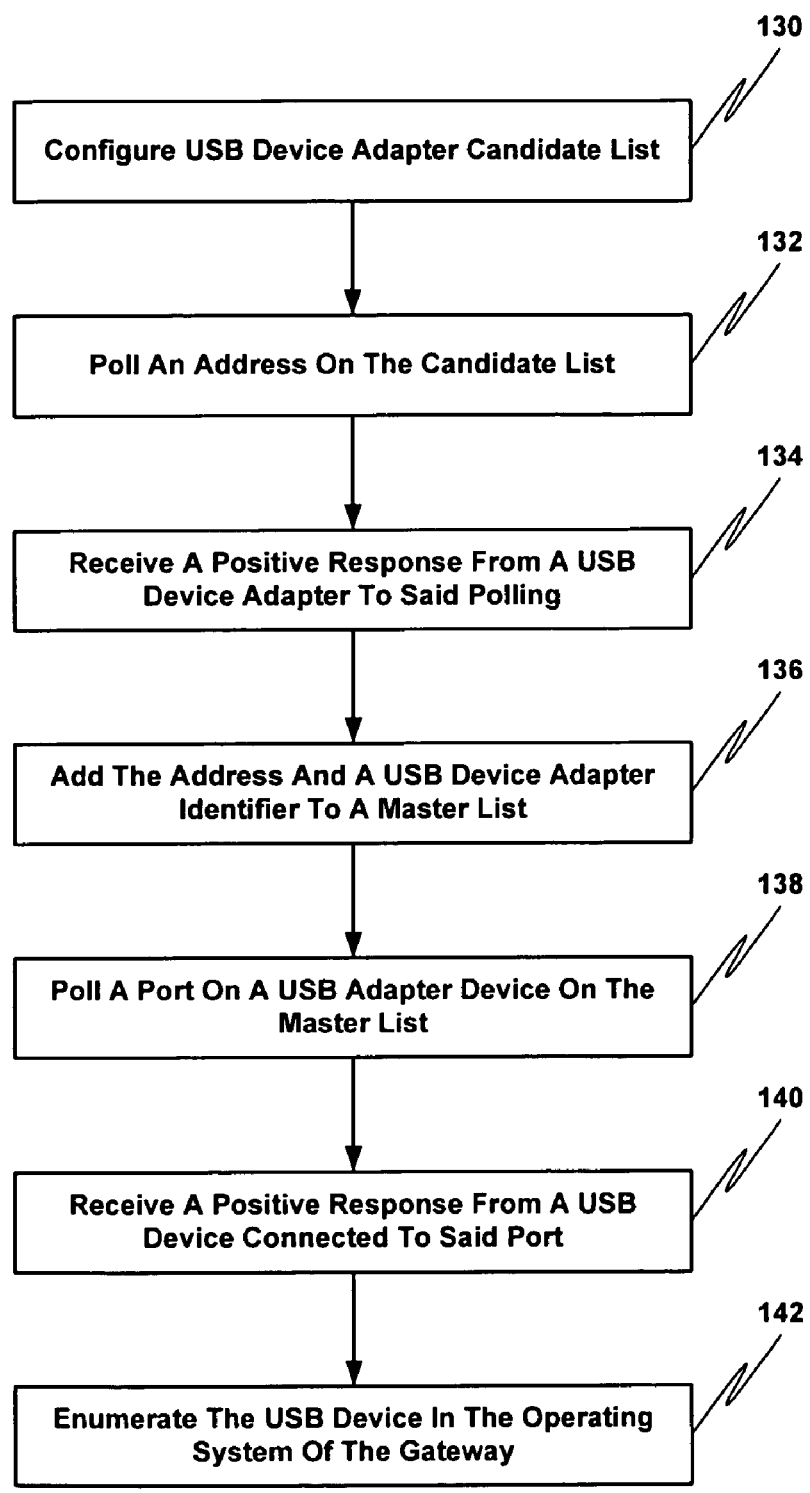
FIG. 6 is a process flow diagram showing a method of establishing a connection between a local processor and a USB device over a local network in accordance with a specific embodiment of the present invention.

FIG. 6 is a process flow diagram showing a method of establishing a connection between a local processor and a USB device over a local network in accordance with a specific embodiment of the present invention. In this method, a USB device adapter candidate list is configured 130. The list includes the network address of at least one USB device adapter. Configuration may be performed manually, or may be accomplished by a "plug-and-play" routine. The polling routine polls an address on the candidate list 132. This polling includes encapsulating a USB packet in one or more network packets. If a USB device adapter is present at the address, the polling routine receives a positive response from the USB device adapter 134. The process includes decapsulating a USB packet from one or more network packets. Once the positive response is recognized, the address and a USB device adapter identifier is added to a master list of USB device adapters on the network 136.

To identify USB devices connected to a USB device adapter on the network, a port on a USB adapter device on the master list is polled by the polling routine 138. Such polling also includes encapsulating a USB packet in one or more network packets. If a USB device is present at the port, a positive response from a USB device connected to said port is received 140. Again, such receiving including decapsulating a USB packet from one or more network packets. Finally, the responding USB device is enumerated in the operating system of the gateway 142.

Both steps 130-136 and steps 138-142 are loops, and each loop may be repeated several times.

Figure 7:
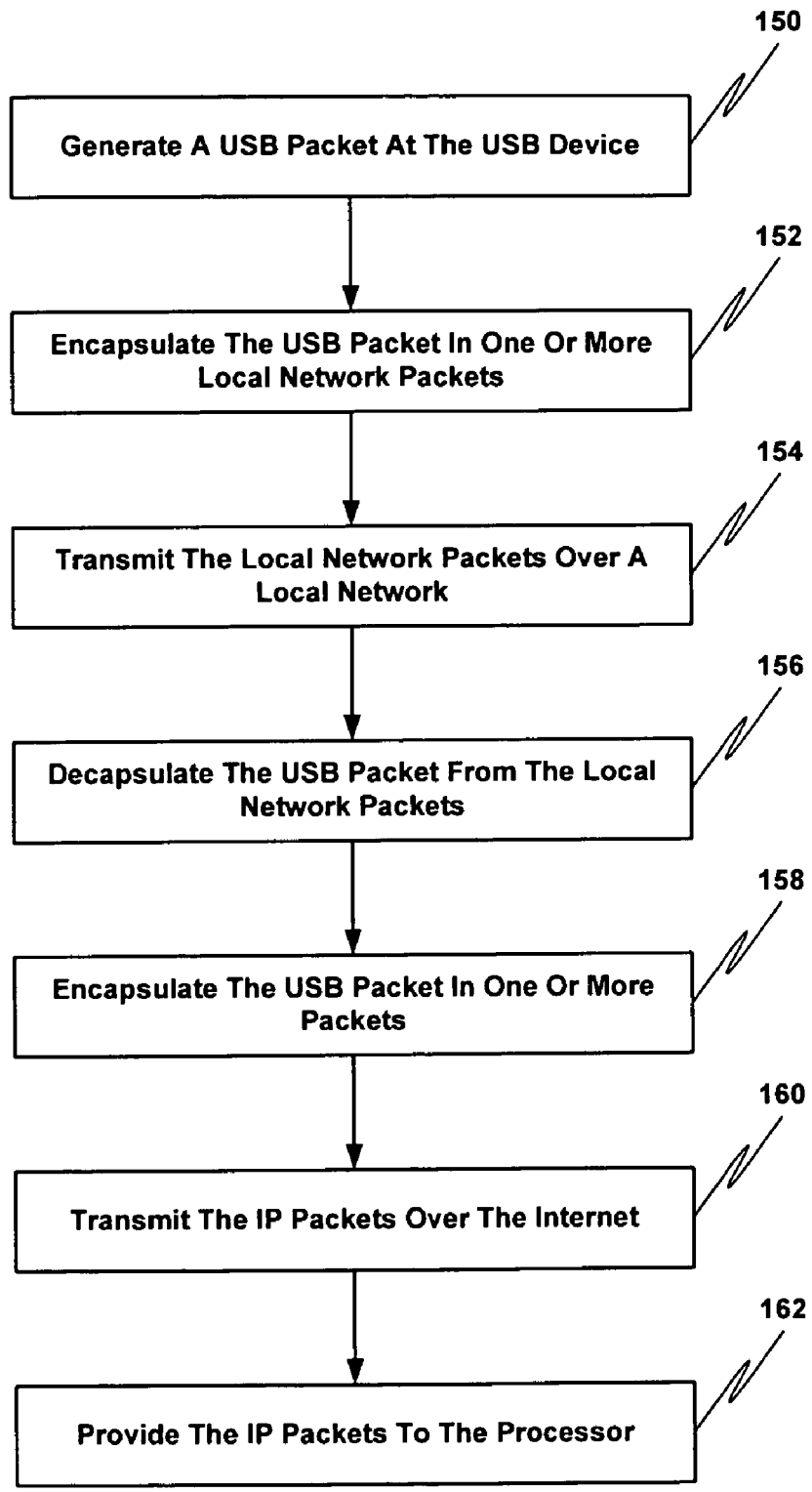
FIG. 7 is a process flow diagram showing a method of providing a signal from a USB device to a processor on the Internet in accordance with a specific embodiment of the present invention.

FIG. 7 is a process flow diagram showing a method of providing a signal from a USB device to a processor on the Internet in accordance with a specific embodiment of the present invention. In the method, a USB packet is generated at the USB device 150. The USB packet is encapsulated in one or more local network packets 152. The local network packets are transmitted over the local network 154. Upon arriving at the gateway, the USB packet is decapsulated from the local network packets 156. Then, based on previously provided instructions, the USB packet is encapsulated in one or more IP packets 158. The IP packets are transmitted over the Internet 160. Finally, the IP packets are provided to the processor at their destination on the Internet 162.

Figure 8:
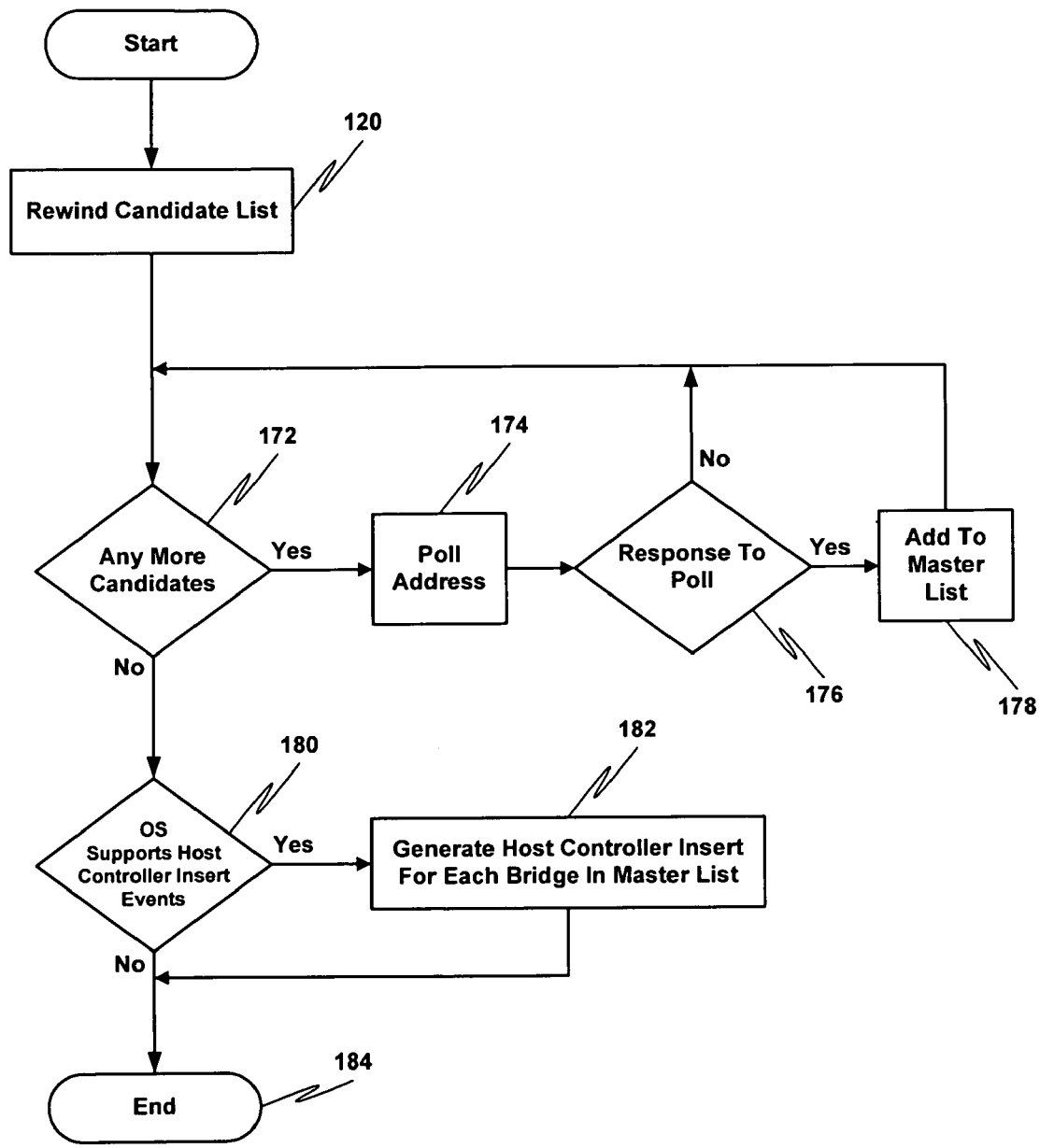
FIG. 8 is a process flow diagram showing a method of providing the identification of USB device adapters in a network in accordance with a specific embodiment of the present invention.

FIG. 8 is a process flow diagram showing a method of providing the identification of USB device adapters in a network in accordance with a specific embodiment of the present invention. The method is performed by the USB remote host control driver. At the beginning of the method, a candidate list of addresses for possible USB device adapters has already been configured.

The method starts by going to the beginning of the candidate list 170. The routine determines if there is an unpolled address on the candidate list 172. If so, responds 176. If a USB device adapter responds to the polling, the USB device adapter is added to the master list 178. The process continues for each address on the candidate list until all the addresses on the candidate list have been polled.

Once the master list is compiled, the routine may determine whether the operating system (OS) of the computer supports automatic insertion of USB devices 180. If the OS supports automatic insertion, it is allowed to do so 182. However, the OS still requires the protocol stack of the USB remote host control driver to communicate with the USB devices through the USB device adapter.

It is also possible to dynamically detect if new device adapters were introduced, enabled, or connected to the system. Such functionality requires that the candidate list be embedded in the system or be dynamically generated, in addition to regular polling of the network for new devices.

Figure 9:
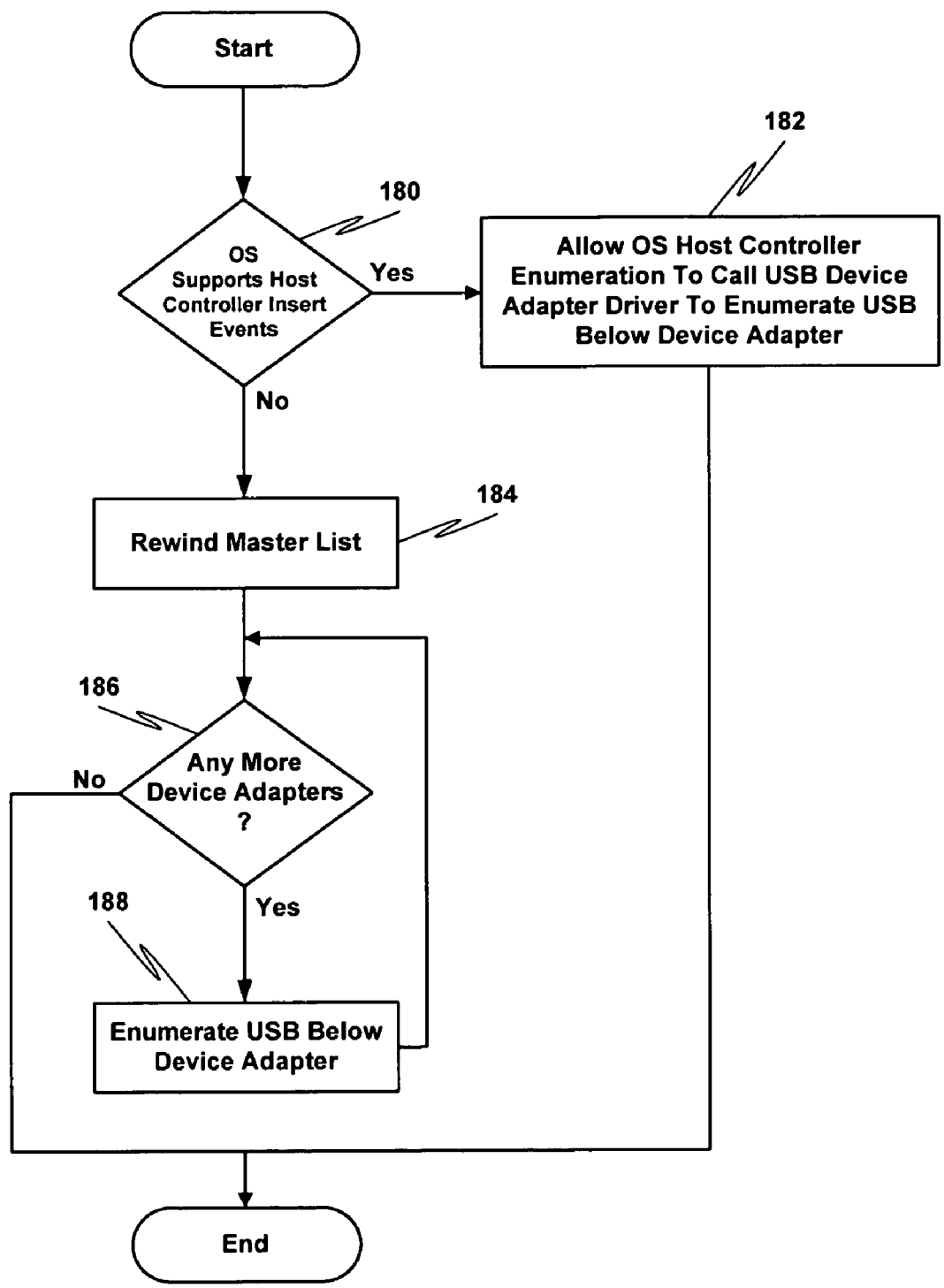
FIG. 9 is a process flow diagram showing a method of providing the identification of USB device adapters in a network in accordance with a specific embodiment of the present invention.

FIG. 9 is a process flow diagram showing a method of providing the identification of USB device adapters in a network in accordance with a specific embodiment of the present invention. If the OS does not support automatic insertion of USB devices, the polling routine must perform this task. The routine starts at the top of the master list 184. For each USB device adapter on the list, the routine polls the ports of the USB device adapter and identifies and enumerates USB devices connected to the USB device adapter 188.

Figure 10:
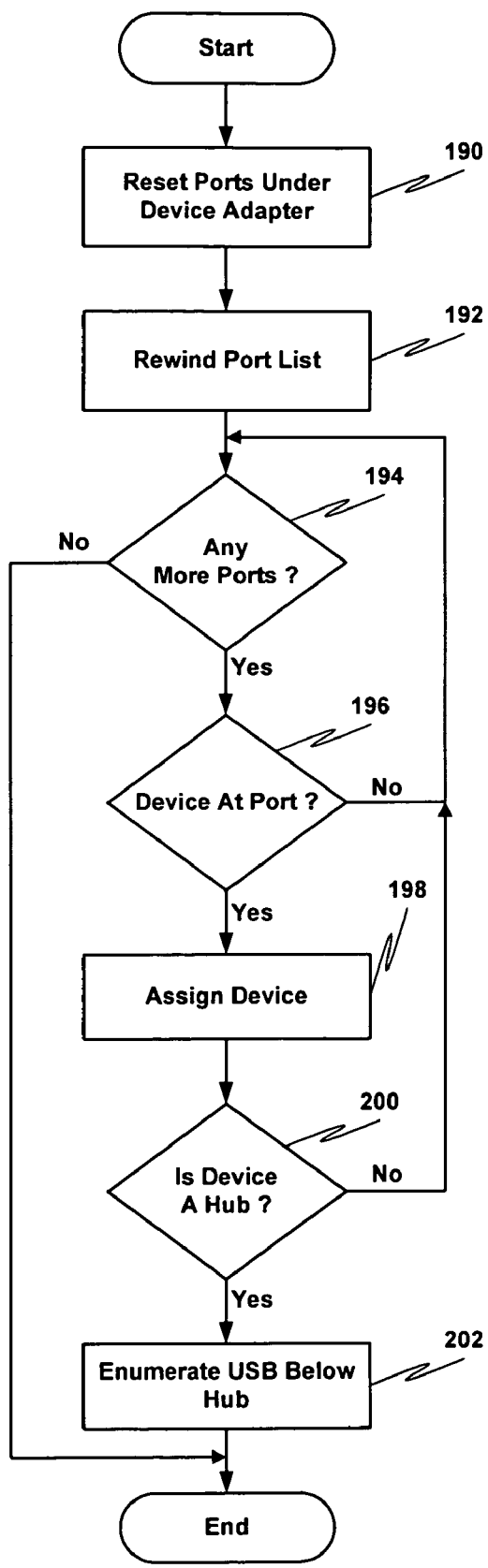
FIG. 10 is a process flow diagram showing a method of providing the identification of USB devices connected to USB device adapters in a network in accordance with a specific embodiment of the present invention.

FIG. 10 is a process flow diagram showing a method of providing the identification of USB devices connected to USB device adapters in a network in accordance with a specific embodiment of the present invention. In enumerating USB devices connected to a USB device adapter on the master list, the routine first resets all the ports on the USB device adapter 190. Then, the routine begins at the top of the list of ports 192. For as long as there are ports left on the list 194, the routine determines by polling if there is a device attached to the port 196. If so, the device is assigned an address in the USB remote host control driver 198. The routine then determines if the attached device is a hub or a peripheral device 200. If the attached device is a peripheral, the USB remote host control driver is configured accordingly. If the device is a hub, the ports on the hub are polled and downstream USB devices are enumerated 202.

Figure 11:
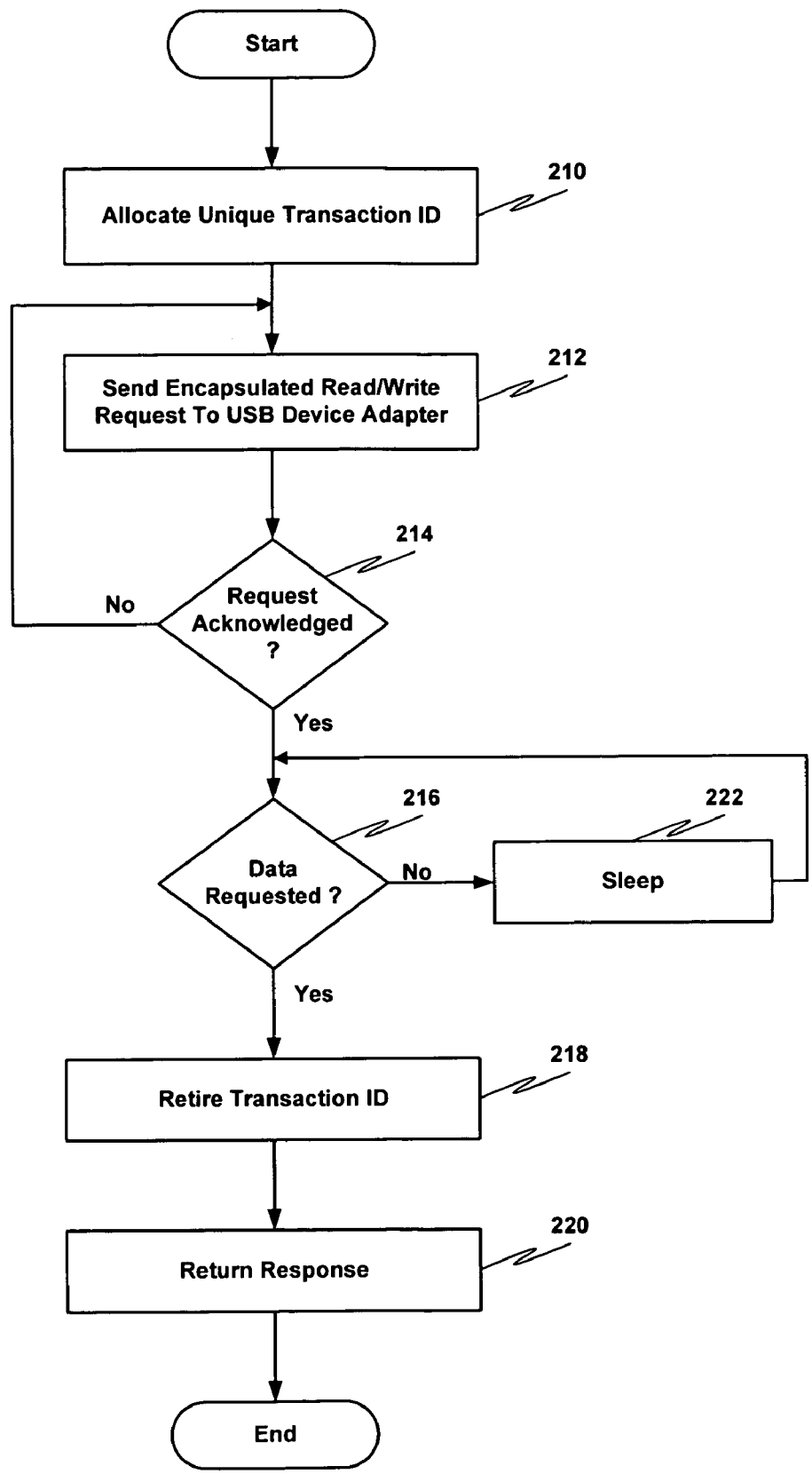
FIG. 11 is a process flow diagram showing a method of data communication between a local processor and a USB device in accordance with a specific embodiment of the present invention.

FIG. 11 is a process flow diagram showing a method of data communication between a local processor and a USB device in accordance with a specific embodiment of the present invention. Once a USB device is enumerated according to the invention, the processor as a master must enable the device as a slave. To allow communication with a device, the processor allocates a unique transaction identification for the device 210. An encapsulated read/write request is sent to the device over the network 212. The network packet header of the read/write request will include the processor address, the device address and additional unique information. If the request is acknowledged properly 214 and data is returned 216, the transaction identification is retired 218 and a response may be returned to the device with a new transaction identification 220. If no data is immediately returned from the device after a proper acknowledgment, the process will sleep and wait for data to be transmitted from the device 222.

Figure 12:
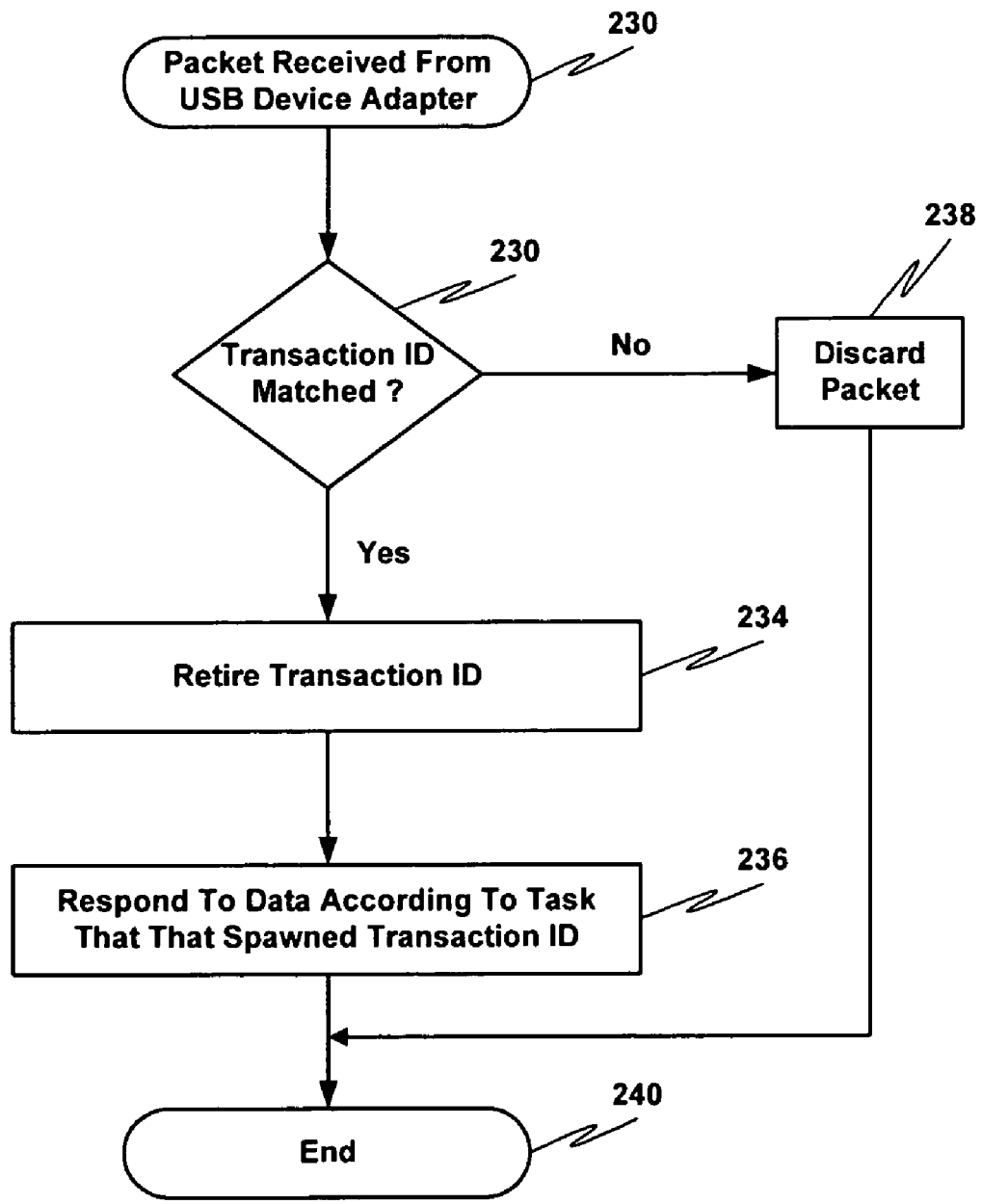
FIG. 12 is a process flow diagram showing a method of data communication between a local processor and a USB device in accordance with a specific embodiment of the present invention.

FIG. 12 is a process flow diagram showing a method of data communication between a local processor and a USB device in accordance with a specific embodiment of the present invention. After a device is enabled by assignment of a unique transaction identification, the processor may receive a packet from the device 230. If the identification of the packet is matched 232, the transaction identification is retired 234 and the processor responds to the decapsulated data according to the task that spawned the transaction identification 236.

In one aspect the invention comprises a universal serial bus (USB) remote host control driver having a connection to a network. The network is further connecting to one or more USB device adapters. Each of said device adapters has a discrete network address. The driver has a network protocol stack. The protocol stack is for encapsulating USB packets in network packets and for decapsulating USB packets from network packets. The driver also has a memory for storing the network address of each of the device adapters and for storing an identification of each USB device connected to each of the device adapters. The driver may further include a polling routine, which contacts each of the device adapters, identifies each of the USB devices, and stores the identifications in the memory. The network packets may be Ethernet packets.

In another aspect, the invention includes a USB device adapter having one or more USB ports, a connection to a network where the network is connected to a USB remote host control driver, a network address, and a network protocol stack where the protocol stack is for encapsulating USB packets in network packets and for decapsulating USB packets from network packets. The network packets may be Ethernet packets.

In another aspect, the invention includes an Internet gateway, comprising a connection to the Internet. The gateway also includes a universal serial bus (USB) remote host control driver having a connection to a local network where the local network further connects to one or more USB device adapters and each of the device adapters has a discrete network address. The driver has a network protocol stack for encapsulating USB packets in network packets and for decapsulating USB packets from network packets. The driver has a memory for storing the network address of each of the device adapters and for storing an identification of each USB device connected to each of the device adapters. The driver also has a polling routine for contacting each of the device adapters, identifying each of the USB devices, and storing the identifications in the memory. The local network may be an Ethernet. The gateway may also include a processor for receiving unencapsulated USB packets from the protocol stack. The gateway may have a connection to a local video monitor, a connection to a local telephone, a connection to a public television cable, and/or a connection to a public telephone network.

In another aspect, the invention includes a method of providing a signal from a USB device over a local network to a local processor. The method comprises generating a USB packet at the USB device, encapsulating the USB packet in one or more network packets, transmitting the network packets over the network, decapsulating the USB packet from the network packets, and providing the USB packet to the processor. Again, the local network may be an Ethernet. The USB device may be a keyboard.

In another aspect, the invention includes a method of establishing a connection between a local processor and a USB device over a local network. The method comprises configuring a USB device adapter candidate list where the list includes the network address of at least one USB device adapter, polling an address on the candidate list where the polling includes encapsulating a USB packet in one or more network packets, receiving a positive response from a USB device adapter to said polling where the receiving includes decapsulating a USB packet from one or more network packets, and adding the address and a USB device adapter identifier to a master list. The method may further comprise polling a port on a USB adapter device on the master list where the polling includes encapsulating a USB packet in one or more network packets, receiving a positive response from a USB device connected to said port where the receiving includes decapsulating a USB packet from one or more network packets, and enumerating a USB device in the operating system of the processor.

In yet another aspect, the invention includes a method of providing a signal from a USB device to a processor on the Internet. The method comprises generating a USB packet at the USB device, encapsulating the USB packet in one or more local network packets, transmitting the local network packets over a local network, decapsulating the USB packet from the local network packets, encapsulating the USB packet in one or more IP packets, transmitting the IP packets over the Internet, and providing the IP packets to the processor.

It will be appreciated that either or both of the USB device adapter or the USB remote host control driver may be implemented in hardware, or software stored on a computer-readable medium, or a combination of hardware and software.

The method is compatible with many types of local network protocols including Ethernet, ATM and IP. For the purposes of this application, Ethernet and ATM frames are herein referred to as packets. Ethernet is a presently preferred implementation of this invention due to its widespread use in local networks.

All types of USB devices are compatible with this invention, including, but not limited to, keyboards, mice, joysticks, cameras, speakers and touch pads.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A universal serial bus (USB) remote host control driver, comprising:
   a port for connection to a network, the remote host control driver configured to communicate with one or more USB device adapters via the port over the network, each of the one or more USB device adapters having a discrete network address;
   a network protocol stack, the protocol stack configured for encapsulating USB packets in network packets and for decapsulating USB packets from network packets, wherein the USB device adapters are coupled to USB devices that send USB packets to a USB protocol stack, which passes those packets to a network bridging task that identifies address information associated with the USB devices and the remote host control driver, and that passes the address information to the network protocol stack;
   a polling routine configured to poll each of possible USB device adapters connected to the network in accordance with a candidate list, and compile a master list of only the possible USB device adapters which responded to the polling and are therefore currently capable of establishing a connection over the network, wherein the candidate list is initially configured with one or more possible USB device adapters, wherein the polling routine is further configured to encapsulate a USB packet in one or more network packets; and
   a memory for storing the master list, the master list containing the discrete network address of each of the one or more USB device adapters which responded to the polling and a corresponding identifier of each USB device connected via the corresponding USB device adapter to the remote host control driver.

2. The USB remote host control driver of claim 1, wherein the polling routine is further configured to contact each of the USB device adapters which responded to the polling in accordance with the master list, identify each of the USB devices connected to each USB device adapter, and store the identifications of the USB devices in the memory.

3. The USB host control driver of claim 1, where the network packets are Ethernet packets.

4. The USB remote host control driver of claim 1 wherein the candidate list is configured manually.

5. The USB remote host control driver of claim 1, further comprising a plug-and-play routine to configure the candidate list.

6. The USB remote host control driver of claim 1 wherein the remote host control driver is further configured to:
   dynamically detect that a new USB device adapter has been introduced, enabled, or connected to the network; and
   generate a new candidate list in response to the detecting.

7. The USB remote host control driver of claim 1 wherein the remote host control driver is further configured to:
   periodically poll the network to detect that a new USB device adapter has been introduced, enabled, or connected to the network; and
   generate a new candidate list in response to the detecting.

8. An Internet gateway, comprising:
   a port for connecting to the Internet; and
   a universal serial bus (USB) remote host control driver, the USB remote host control driver comprising:
   a port for connecting to a local network, the remote host control driver configured to communicate with one or more USB device adapters via the port over the network, each of the one or more USB device adapters having a discrete network address;
   a local network protocol stack, the protocol stack for encapsulating USB packets in local network packets and for decapsulating USB packets from local network packets, wherein the USB device adapters are coupled to USB devices that send USB packets to a USB protocol stack, which passes those packets to a network bridging task that identifies address information associated with the USB devices and the remote host control driver, and that passes the address information to the network protocol stack;
   a polling routine configured to poll each of possible USB device adapters connected to the local network in accordance with a candidate list, and compile a master list of only the possible USB device adapters which responded to the polling and are therefore currently capable of establishing a connection over the network, wherein the candidate list is initially configured with one or more possible USB device adapters, wherein the polling routine is further configured to encapsulate a USB packet in one, or more network packets; and
   a memory for storing the master list, the master list containing the discrete network address of each of the USB device adapters which responded to the polling and an identifier of each USB device connected via the corresponding USB device adapter to the remote host control driver.

9. The Internet gateway of claim 8, where the local network is an Ethernet.

10. The Internet gateway of claim 8, further comprising a processor configured to receive unencapsulated USB packets from the protocol stack.

11. The Internet gateway of claim 10, further comprising: a means for connecting to a local video monitor.

12. The Internet gateway of claim 10, further comprising: a means for connecting to a local telephone.

13. The Internet gateway of claim 10, further comprising: a means for connecting to a public television cable.

14. The Internet gateway of claim 10, further comprising: a means for connecting to a public telephone network.

15. The Internet gateway of claim 8, wherein the polling routine is further configured to contact each of the device adapters which responded to the polling in accordance with the master list, identify each of the USB devices connected to each device adapter, and store the identifications of the USB devices in the memory.

16. The Internet gateway of claim 6 wherein the candidate list is configured manually.

17. The Internet gateway of claim 6, further comprising a plug-and-play routine to configure the candidate list.

18. The Internet gateway of claim 8 wherein the USB remote host control driver is further configured to:
dynamically detect that a new USB device adapter has been introduced, enabled, or connected to the network; and
generate a new candidate list in response to the detecting.

19. The Internet gateway of claim 8 wherein the USB remote host control driver is further configured to:
periodically poll the network to detect that a new USB device adapter has been introduced, enabled, or connected to the network; and
generate a new candidate list in response to the detecting.

20. A serial data bus remote host control driver, comprising:
a port for connecting to a network, the remote host control driver configured to communicate with one or more serial data bus device adapters via the port over the network, each of the one or more serial data bus device adapters having a discrete network address;
a network protocol stack, the protocol stack for encapsulating serial data bus packets in network packets and for decapsulating serial data bus packets from network packets, wherein the USB device adapters are coupled to USB devices that send USB packets to a USB protocol stack, which passes those packets to a network bridging task that identifies address information associated with the USB devices and the remote host control driver, and that passes the address information to the network protocol stack;
a polling routine configured to poll each of possible device adapters connected to the network in accordance with a candidate list, and compile a master list of only the possible serial data bus device adapters which responded to the polling and are therefore currently capable of establishing a connection over the network, wherein the candidate list is initially configured with one or more possible serial data bus device adapters, wherein the polling routine is further configured to encapsulate a USB packet in one or more network packets; and
a memory for storing the master list, the master list containing the discrete network address of each of the device adapters which responded to the polling and an identifier of each serial data bus device connected via the corresponding serial data bus device adapter to the remote host control driver.

21. The serial data bus remote host control driver of claim 20, wherein the polling routine is further configured to contact each of the device adapters which responded to the polling in accordance with the master list, identify each of the serial data bus devices connected to each device adapter, and store the identifications of the serial data bus device in the memory.

22. The serial data bus host control driver of claim 20, where the network packets are Ethernet packets.

23. The serial data bus remote host control driver of claim 20 wherein the candidate list is configured manually.

24. The serial data bus remote host control driver of claim 20, further comprising a plug-and-play routine to configure the candidate list.

25. The serial data bus remote host control driver of claim 20 wherein the remote host control driver is further configured to:
dynamically detect that a new serial data bus device adapter has been introduced, enabled, or connected to the network; and
generate a new candidate list in response to the detecting.

26. The serial data bus remote host control driver of claim 20 wherein the remote host control driver is further configured to:
periodically poll the network to detect that a new serial data bus device adapter has been introduced, enabled, or connected to the network; and
generate a new candidate list in response to the detecting.

27. An Internet gateway, comprising:
a port for connecting to the Internet; and
a serial data bus remote host control driver, the serial data bus remote host control driver comprising:
a port for connecting to a local network, the remote host control driver configured to communicate with one or more serial data bus device adapters via the port over the network, each of the one or more serial data bus device adapters having a discrete network address;
a local network protocol stack, the protocol stack for encapsulating serial data bus packets in local network packets and for decapsulating serial data bus packets from network packets, wherein the USB device adapters are coupled to USB devices that send USB packets to a USB protocol stack, which passes those packets to a network bridging task that identifies address information associated with the USB devices and the remote host control driver, and that passes the address information to the network protocol stack;
a polling routine configured to poll each of possible device adapters connected to the network in accordance with a candidate list, and compile a master list of only the serial data bus device adapters which responded to the polling and are therefore currently capable of establishing a connection over the network, wherein the candidate list is initially configured with one or more possible serial data bus device adapters, wherein the polling routine is further configured to encapsulate a USB packet in one or more network packets; and
a memory for storing the master list, the master list containing the discrete network address of each of the device adapters which responded to the polling and an identifier of each serial data bus device connected via the corresponding serial data bus device adapter to the remote host control driver.

28. The Internet gateway of claim 27, where the local network is an Ethernet.

29. The Internet gateway of claim 27, further comprising a processor configured to receive unencapsulated serial data bus packets from the protocol stack.

30. The Internet gateway of claim 29, further comprising a means for connecting to a local video monitor.

31. The Internet gateway of claim 29, further comprising a means for connecting to a local telephone.

32. The Internet gateway of claim 29, further comprising a means for connecting to a public television cable.

33. The Internet gateway of claim 29, further comprising a means for connecting to a public telephone network.

34. The Internet gateway of claim 27, wherein the polling routine is further configured to contact each of the device adapters which responded to the polling in accordance with the master list, identify each of the serial data bus devices connected to each device adapter, and store the identifications of the serial data bus devices in the memory.

35. The Internet gateway of claim 27 wherein the candidate list is configured manually.

36. The Internet gateway of claim 27, further comprising a plug-and-play routine to configure the candidate list.

37. The Internet gateway of claim 27 wherein the serial data bus remote host control driver is further configured to:
dynamically detect that a new serial data bus device adapter has been introduced, enabled, or connected to the network; and
generate a new candidate list in response to the detecting.

38. The Internet gateway of claim 27 wherein the serial data bus remote host control driver is further configured to:
periodically poll the network to detect that a new serial data bus device adapter has been introduced, enabled, or connected to the network; and
generate a new candidate list in response to the detecting.

39. A universal serial bus (USB) remote host control driver, comprising:
means for connecting to a network, the remote host control driver configured to communicate with one or more USB device adapters via the means for connecting over the network, each of the one or more USB device adapters having a discrete network address;
means for encapsulating USB packets in network packets and for decapsulating USB packets from network packets, wherein the USB device adapters are coupled to USB devices that send USB packets to a USB protocol stack, which passes those packets to a network bridging task that identifies address information associated with the USB devices and the remote host control driver, and that passes the address information to the means for encapsulating;
means for polling each of possible USB device adapters connected to the network in accordance with a candidate list, and compile a master list of only the possible USB device adapters which responded to the polling and are therefore currently capable of establishing a connection over the network, wherein the candidate list is initially configured with one or more possible USB device adapters, wherein the polling includes encapsulating a USB packet in one or more network packets; and
means for storing the master list, the master list containing the discrete network address of each of the USB device adapters which responded to the polling and an identifier of each USB device connected via the corresponding USB device adapter to the remote host control driver.

40. The USB remote host control driver of claim 39, wherein the means for polling is further configured to contact each of the device adapters which responded to the polling in accordance with the master list, identify each of the USB devices connected to each USB device adapter, and store the identifications of the USB devices in the means for storing.

41. An Internet gateway, comprising:
means for connecting to the Internet; and
a universal serial bus (USB) remote host control driver, the USB remote host control driver comprising:
means for connecting to a network, the remote host control driver configured to communicate with one or more USB device adapters via the means for connecting over the network, each of the one or more USB device adapters having a discrete network address;
means for encapsulating USB packets in network packets and for decapsulating USB packets from network packets, wherein the USB device adapters are coupled to USB devices that send USB packets to a USB protocol stack, which passes those packets to a network bridging task that identifies address information associated with the USB devices and the remote host control driver, and that passes the address information to the means for encapsulating;
means for polling each of possible USB device adapters connected to the network in accordance with a candidate list, and compile a master list of only the possible USB device adapters which responded to the polling and are therefore currently capable of establishing a connection over the network, wherein the candidate list is initially configured with one or more possible USB device adapters, wherein the polling includes encapsulating a USB packet in one or more network packets; and
means for storing the master list, the master list containing the discrete network address of each of the USB device adapters which responded to the polling and an identifier of each USB device connected via the corresponding USB device adapter to the remote host control driver.

42. The Internet gateway of claim 41, wherein the means for polling is further configured to contact each of the USB device adapters which responded to the polling in accordance with the master list, identify each of the USB devices connected to each USB device adapter, and storing the identifications of the USB devices in the means for storing.

43. A serial data bus remote host control driver, comprising:
means for connecting to a network, the remote host control driver configured to communicate with one or more serial data bus device adapters via the means for connecting over the network, each of the one or more serial data bus device adapters having a discrete network address;
means for encapsulating serial data bus packets in network packets and for decapsulating serial data bus packets from network packets, wherein the USB device adapters are coupled to USB devices that send USB packets to a USB protocol stack, which passes those packets to a network bridging task that identifies address information associated with the USB devices and the remote host control driver, and that passes the address information to the means for encapsulating;
means for polling each of possible device adapters connected to the network in accordance with a candidate list, and compile a master list of only the serial data bus device adapters which responded to the polling and are therefore currently capable of establishing a connection over the network, wherein the candidate list is initially configured with one or more possible serial data bus device adapters, wherein the polling includes encapsulating a USB packet in one or more network packets; and means for storing the master list, the master list containing the discrete network address of each of the device adapters which responded to the polling and an identifier of each serial data bus device connected via the corresponding serial data bus device adapter to the remote host control driver.

44. The serial data bus remote host control driver of claim 43, wherein the means for polling is further configured to contact each of the device adapters which responded to the polling in accordance with the master list, identify each of the serial data bus devices connected to each device adapter, and store the identifications of the serial data bus devices in the means for storing.

45. An Internet gateway, comprising:

means for connecting to the Internet; and a serial data bus remote host control driver, the serial data bus remote host control driver comprising:
  (a) means for connecting to a network, the remote host control driver configured to communicate with one or more serial data bus device adapters via the means for connecting over the network, each of the one or more serial data bus device adapters having a discrete network address;
  (b) means for encapsulating serial data bus packets in network packets and for decapsulating serial data bus packets from network packets, wherein the USB device adapters are coupled to USB devices that send USB packets to a USB protocol stack, which passes those packets to a network bridging task that identifies address information associated with the USB devices and the remote host control driver, and that passes the address information to the means for encapsulating;
  (c) means for polling each of possible device adapters connected to the network in accordance with a candidate list, and compile a master list of only the serial data bus device adapters which responded to the polling and are therefore currently capable of establishing a connection over the network, wherein the candidate list is initially configured with one or more possible serial data bus device adapters, wherein the polling includes encapsulating a USB packet in one or more network packets; and
  (d) means for storing the master list, the master list containing the discrete network address of each of the device adapters which responded to the polling and an identifier of each serial data bus device connected via the corresponding serial data bus device adapter to the remote host control driver.

46. The Internet gateway of claim 45, wherein the means for polling is further configured to contact each of the device adapters which responded to the polling in accordance with the master list, identify each of the serial data bus devices connected to each device adapter, and storing the identifications of the serial data bus devices in the means for storing.

47. A system comprising:

a universal serial bus (USB) remote host control driver; and at least one universal serial bus (USB) device adapter, the USB remote host control driver being connected to at least one USB device via the at least one USB device adapter over a network, wherein the USB remote host control driver comprising:
  a port for connecting to the network, the remote host control driver configured to communicate with the at least one USB device adapter via the port over the network, each USB device adapter having a discrete network address;
  a network protocol stack, the protocol stack for encapsulating USB packets in network packets and for decapsulating USB packets from network packets;
  a polling routine configured to poll each of possible USB device adapters connected to the network in accordance with a candidate list, and compile a master list of only the possible USB device adapters which responded to the polling and are therefore currently capable of establishing a connection over the network, wherein the candidate list is initially configured with one or more possible USB device adapters, wherein the polling routine is further configured to encapsulate a USB packet in one or more network packets; and
  a memory for storing the master list, the master list containing the discrete network address of each of the USB device adapters which responded to the polling and an identifier of each USB device connected via the corresponding USB device adapter to the remote host control driver, and wherein each of the one or more USB device adapters comprises;
  a memory for storing an assigned network address;
  a network protocol stack, the protocol stack for encapsulating USB packets in network packets and for decapsulating USB packets from the network packets; and
  a bridging task for receiving USB packets from one or more USB devices coupled to the corresponding USB device adapters and for passing USB device addressing information and the USB packets to the network protocol stack.

48. The system of claim 47, wherein the polling routine is further configured to contact each of the USB device adapters which responded to the polling in accordance with the master list, identify each of the USB devices connected to each USB device adapter, and store the identifications of the USB devices in the memory.

49. The system of claim 47, wherein the network packets are Ethernet packets.

50. The system of claim 47 wherein the candidate list is configured manually.

51. The system of claim 47, further comprising a plug-and-play routine to configure the candidate list.

52. The system of claim 47 wherein the USB remote host control driver is further configured to:
  dynamically detect that a new USB device adapter has been introduced, enabled, or connected to the network; and
  generate a new candidate list in response to the detecting.

53. The system of claim 47 wherein the USB remote host control driver is further configured to:
  periodically poll the network to detect that a new USB device adapter has been introduced, enabled, or connected to the network; and
  generate a new candidate list in response to the detecting.

54. A system comprising:

a serial data bus remote host control driver; and at least one serial data bus device adapter, the serial data bus remote host control driver connected to at least one serial data bus device via the at least one the serial data bus device adapter over a network, wherein the serial data bus remote host control driver comprising:

a port for connecting to the network, the remote host control driver configured to communicate with at least one serial data bus device adapter via the port over the network, each of the at least one serial data bus device adapter having a discrete network address;

a network protocol stack, the protocol stack for encapsulating serial data bus packets in network packets and for decapsulating serial data bus packets from network packets;

a polling routine configured to poll each of possible device adapters connected to the network in accordance with a candidate list, and compile a master list of only the serial data bus device adapters which responded to the polling and are therefore currently capable of establishing a connection over the network, wherein the candidate list is initially configured with one or more possible serial data bus device adapters, wherein the polling routine is further configured to encapsulate a USB packet in one or more network packets; and a memory for storing the master list, the master list containing the discrete network address of each of the device adapters and an identifier of each serial data bus device connected via the corresponding serial data bus device adapter to the remote host control driver, and wherein each of the at least one serial data bus device adapter comprises:
a memory for storing an assigned network address;
a network protocol stack, the protocol stack for encapsulating serial data bus packets in network packets and for decapsulating serial data bus packets from the network packets; and
a bridging task for receiving serial data bus packets from one or more serial data bus devices coupled to the corresponding device adapters and for passing serial data bus device addressing information and the serial data bus packets to the network protocol stack.

55. The system of claim 54, wherein the polling routine is further configured to contact each of the device adapters which responded to the polling in accordance with the master list, identify each of the serial data bus devices connected to each device adapter, and store the identifications of the serial data bus devices in the memory.

56. The system of claim 54, where the network packets are Ethernet packets.

57. The system of claim 54 wherein the candidate list is configured manually.

58. The system of claim 54, further comprising a plug-and-play routine to configure the candidate list.

59. The system of claim 54 wherein the serial data bus remote host control driver is further configured to:
dynamically detect that a new serial data bus device adapter has been introduced, enabled, or connected to the network; and
generate a new candidate list in response to the detecting.

60. The system of claim 54 wherein the serial data bus remote host control driver is further configured to:
periodically poll the network to detect that a new serial data bus device adapter has been introduced, enabled, or connected to the network; and
generate a new candidate list in response to the detecting.

61. A system comprising:
a universal serial bus (USB) remote host control driver; and at least one USB device adapter, the USB remote host control driver connected to the corresponding USB devices via the at least one USB device adapter over a network, wherein the USB remote host control driver comprises:
means for connecting to the network, the remote host control driver configured to communicate with the at least one USB device adapter via the means over the network, each of the at least one USB device adapter having a discrete network address;
means for encapsulating USB packets in network packets and for decapsulating USB packets from network packets;
means for polling each of possible USB device adapters connected to the network in accordance with a candidate list, and compile a master list of only the possible USB device adapters which responded to the polling and are therefore currently capable of establishing a connection over the network, wherein the candidate list is initially configured with one or more possible USB device adapters, wherein the polling includes encapsulating a USB packet in one or more network packets; and
means for storing the master list, the master list containing the discrete network address of each of the USB device adapters which responded to the polling and an identifier of each USB device connected via the corresponding USB device adapter to the remote host control driver, and wherein each of the USB device adapters comprises:
means for storing an assigned network address;
means for encapsulating USB packets in network packets and for decapsulating USB packets from the network packets; and
means for receiving USB packets from one or more USB devices coupled to the corresponding USB device adapters and for passing USB device addressing information and the USB packets to the means for encapsulating.

62. The system of claim 61, wherein the means for polling is further configured to contact each of the USB device adapters which responded to the polling in accordance with the master list, identify each of the USB devices connected to each USB device adapter, and store the identifications of the USB devices in the means for storing.

63. A system comprising:
a serial data bus remote host control driver; and
at least one serial data bus device adapter, the serial data bus remote host control driver connected to at least one serial data bus device via at least one serial data bus device adapter over a network,
wherein the serial data bus remote host control driver comprising:
means for connecting to the network, the remote host control driver configured to communicate with the at least one serial data bus device adapter via the means over the network, each of the at least one serial data bus device adapters having a discrete network address;
means for encapsulating serial data bus packets in network packets and for decapsulating serial data bus packets from network packets;
means for polling each of possible serial data bus device adapters connected to the network in accordance with a candidate list, and compile a master list of only the serial data bus device adapters which responded to the polling and are therefore currently capable of establishing a connection over the network, wherein the candidate list is initially configured with one or more possible serial data bus device adapters, wherein the polling includes encapsulating a USB packet in one or more network packets; and means for storing the master list, the master list containing the discrete network address of each of the at least one serial data bus device adapter and an identifier of each serial data bus device connected via the corresponding serial data bus device adapter to the remote host control driver, and wherein each of the at least one serial data bus device adapters comprising:

means for storing an assigned network address;

means for encapsulating serial data bus packets in network packets and for decapsulating serial data bus packets from the network packets; and means for receiving serial data bus packets from one or more serial data bus devices coupled to the corresponding device adapters and for passing serial data bus device addressing information and the serial data bus packets to the means for encapsulating.

64. The system of claim 63, wherein the means for polling is further configured to contact each of the device adapters which responded to the polling in accordance with the master list, identify each of the serial data bus devices connected to each device adapter, and store the identifications of the serial data bus devices in the means for storing.

* * * * *